Jan. 1, 1924.

R. CHILTON 1,479,225

ENGINE ACCESSORIES UNIT

Filed Dec. 29, 1922    2 Sheets-Sheet 2

INVENTOR
Roland Chilton
BY
Verner G. Rachermund
ATTORNEY

Patented Jan. 1, 1924.

1,479,225

UNITED STATES PATENT OFFICE.

ROLAND CHILTON, OF KEYPORT, NEW JERSEY, ASSIGNOR TO AEROMARINE PLANE & MOTOR COMPANY, A CORPORATION OF NEW YORK.

ENGINE-ACCESSORIES UNIT.

Application filed December 29, 1922. Serial No. 609,778.

*To all whom it may concern:*

Be it known tha I, ROLAND CHILTON, a subject of the King of England, and a resident of Keyport, in the county of Monmouth and State of New Jersey, have invented certain new and useful Improvements in Engine-Acessories Units, of which the following is a specification, reference being had to the accompanying drawings, forming part of this specification.

This invention relates to improvements in mechanisms for mounting and driving the accessories of internal combustion engines and applies more specifically to aircraft engines, and especially aims at an improved manner of grouping and driving the various accessories, such as magnetos, oil and water pumps, starting crank, electric starters, fuel pumps, starting magnetos and the like.
Most engines of the character specified require for their operation a plurality of magnetos, oil pumps, water pumps, and the disposition of all these accessories in the most compact possible manner and in accessible positions, is one of the objects of this invention.

Another object of the invention is to so dispose the various units that they may be driven with the least possible number of shafts, gears, bearings, housings, and the like.

The two magnetos which must usually be accommodated on aircraft engines are commonly disposed with their drive shaft ends facing towards each other and to the center of the engine, and are thus transversely spread apart by the space occupied by the drive shafts, gears and their bearings, with the result that the magnetos usually overhang the width of the engine by a considerable amount, which in turn necessitates a relatively long cantilever support.

The present disclosure features a disposition wherein the driving ends of the magnetos point in substantially the same direction while the bases of the magnetos may be oppositely disposed, which leads to a relatively simple and rugged bracket for their support. Further, with this disposition, the end of each magneto drive shaft not used for driving a magneto becomes available for the driving of other engine accessories. It will be seen from the showing that although there are only three gears with three shafts, provision is made for the mounting and driving for at least five engine accessories. This simplification of the driving mechanism is one of the objects of this invention.

It will be seen that with a bracket of the type featured there is considerable latitude allowed as to the number of accessories mounted. On account of this simplification in the drive, this invention makes it practical to provide a relatively great number of stations for driving a variety of accessories so that a wide range of engine requirements in this respect can be met. For instance, in the drawings there is shown installed on the bracket two magnetos, a duplex water pump, an oil pump, a fuel pump, a longitudinal hand crank and, alternatively, a starting magneto, or an electric starter.

Substantially similar engine-driven accessories are often applied to a wide range of engine types and where such accessories are located at various points about the engine structure, as is usual, the local conditions as to available driving and supporting means usually entails some special modification of the accessories for each engine. A further object of the present invention is to provide an accessory bracket and driving mechanism which shall be applicable without change to a variety of sizes and styles of engines, and without modification of the accessories.

One of the difficulties encountered in the layout of the accessories in connection with aircraft engines which this invention aims to overcome, is that the accessories must be so located as not to interfere with the longitudinal engine bearers which commonly extend beyond the rear or anti-propeller end of the engine.

It is common practice in both aircraft and automobile engines to mount certain of the accessories, such as for instance, the water pumps and oil pumps in the oil sump or bottom portion of the crank case. In the interests of accessibility and toward the elimination of difficulty associated with the alignment of the drives, the present invention contemplates the removal of such accessories from the oil sump. This procedure has the additional advantage that this member is thereby very much simplified in form, and can in certain cases readily be made up from sheet metal. This effects a saving in weight as against the alternative cast sump which is necessitated where housings for accessories and their drives must be provided in the sump. A saving in weight is one of the objects of this invention.

It is further found that where accessories are mounted in the oil sump they are apt to objectionally increase the over-all height of the engine, whereas in the case of the disposition featured in the present invention, a higher location for the accessories is provided which does not increase the height of the engine.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:—

Figure 1:
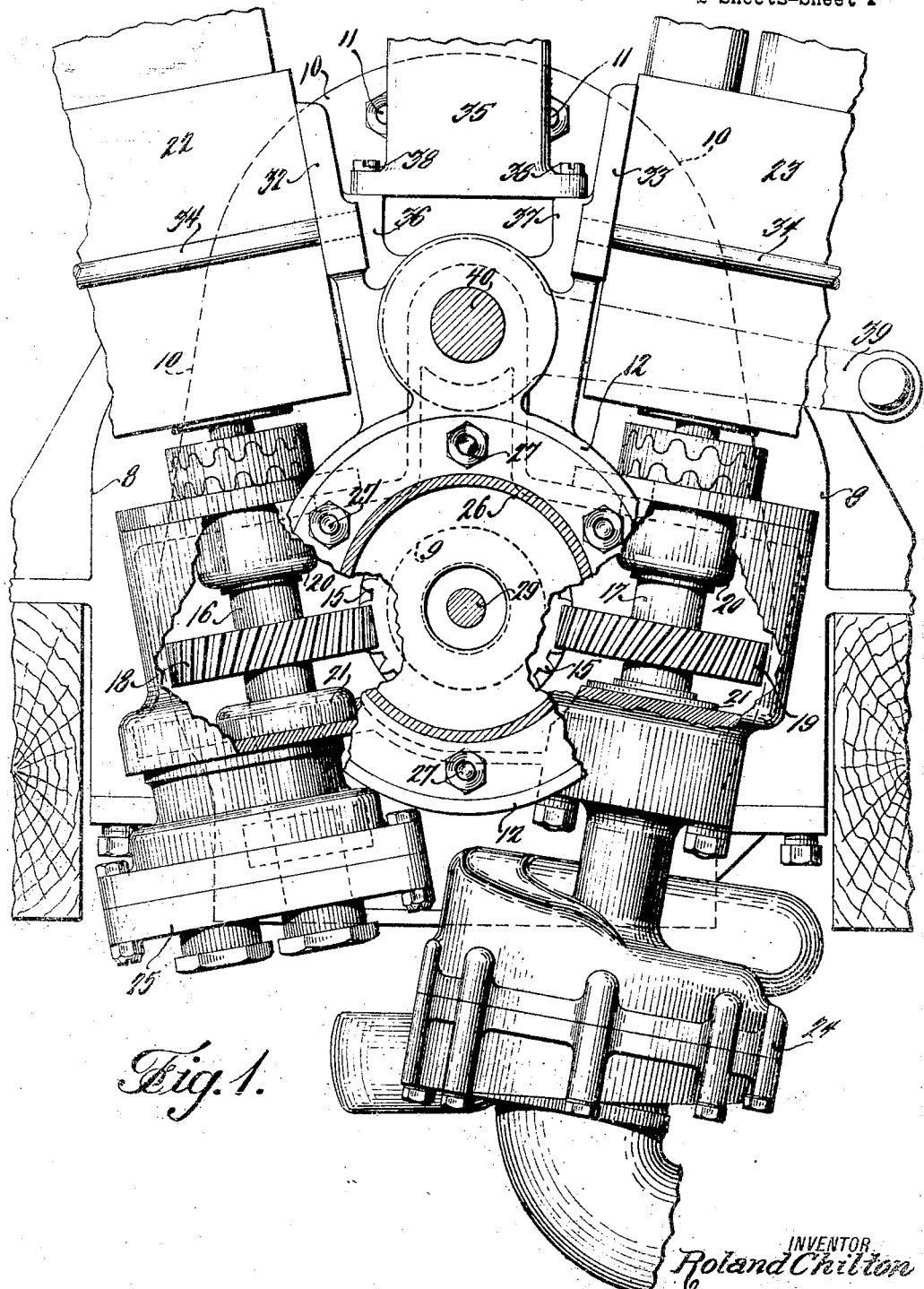
Figure 1 is an end view in elevation illustrating a preferred embodiment of my invention shown as mounted in position on an aeroplane engine, parts being broken away for the sake of clearness.
Figure 2:
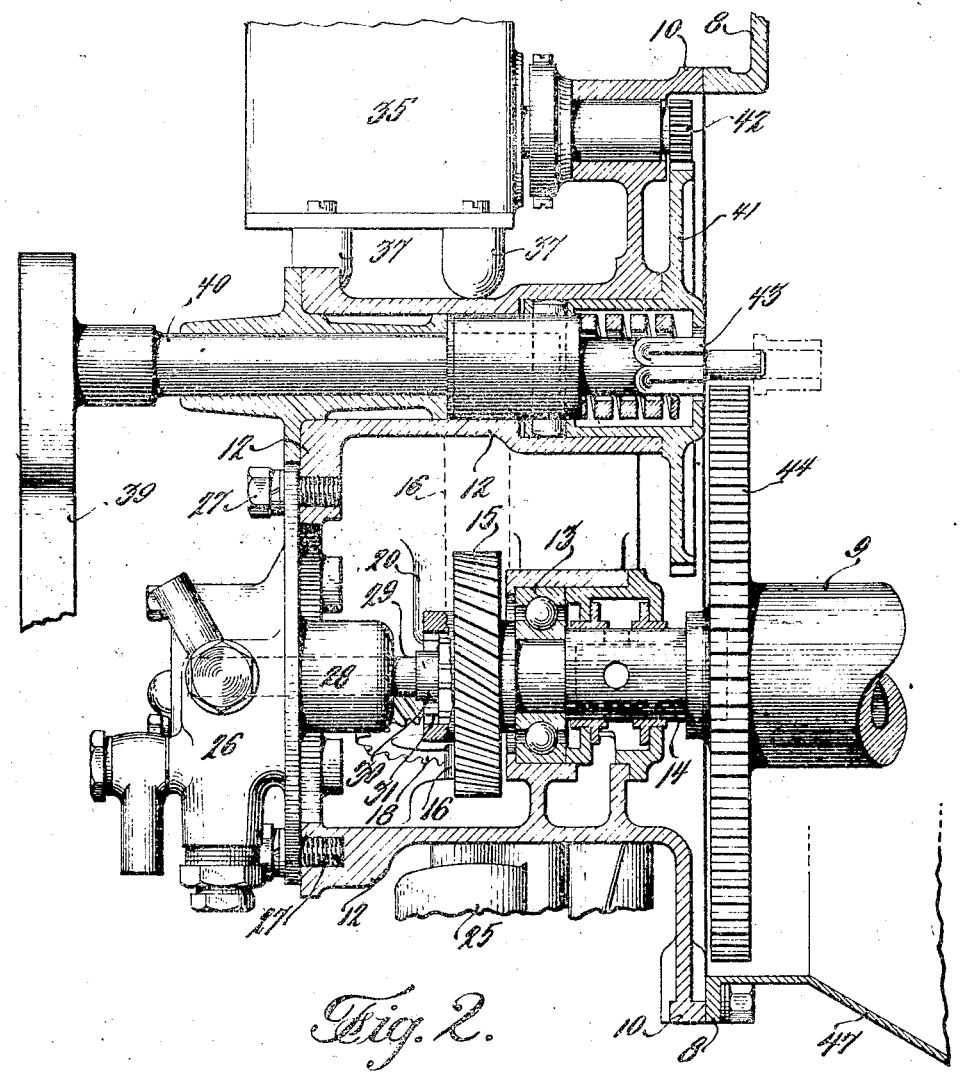
Figure 2 is a vertical longitudinal section of the parts shown in Fig. 1 and taken approximately at the center.

In the drawings there is disclosed part of a conventional form of internal combustion engine in which 8 is an open portion of the crank case at the anti-propeller end of the engine, 9 being the normally free end of the crank shaft disposed adjacent to said open portion.

The device featured in this disclosure is in the form of an attachment having an exposed end outlined by a flange 10 which is demountably secured to the open portion 8 of the crank case in any suitable manner as with bolts 11. A housing 12 is formed integral with the flange 10 and is provided with a bearing 13, adapted to support an extension drive shaft 14 to which is secured a gear 15. Two shafts 16, 17, more specifically referred to as accessory drive shafts, having gears 18, 19 mounted thereon, are disposed partly within the housing 12 and journaled in the bearings 20, 21 on either side of the extension drive shaft 14; the gears 18, 19 of said shafts meshing with the gear 15 and being driven thereby. The shafts 16, 17 can be arranged in a substantially vertical manner or mutually inclined as convenient or desirable. The ends of the shafts project exteriorly of the housing above and below and are adapted to have engine accessories such as the magnetoes 22, 23 drivably connected thereto at their upper ends and a water pump 24 and an oil pump 25 at the lower ends.

An accessory such as a fuel pump 26 can be mounted on the end of the housing 12 and secured thereto by means of the screws 27, said pump being provided with a bearing 28 in which is journaled an operating shaft 29 and arranged in axial alignment with the extension drive shaft 14. The shaft 29 has an enlarged end portion 30 provided with means to be engaged by the splines 31 formed in this showing integral with the gear 15 and adapted to drive the shaft 29.

The magnetos 22, 23 are secured to the portions 32, 33 of the housing by the tie bolts 34 and are preferably spaced apart to provide for the disposal of an additional accessory therebetween which in the present instance is shown as a starting magneto 35 secured to the supporting portions 36, 37 by the screws 38 and which is operated by the hand crank 39 through a shaft 40 supported in the housing and a gear 41 and pinion 42; an automatically shiftable pinion 43 will at the same time mesh with the gear 44 to "turn over" or start the engine when the handle 39 is rotated.

The shifting of the pinion 43 can be accomplished in any well known manner and is not a feature of this invention.

An electric starting motor may be used as an alternative for the starting magneto 35 when it becomes desirable to start the engine in this manner.

The sump 47 with the present disposition of the accessories as explained hereintofore can be constructed of comparatively thin material which is a factor in reducing the total weight of the engine.

It will be seen from the above description that a plurality of engine accessories can be compactly disposed in the above said manner on the engine so as to permit of them being collectively operated from the extension drive shaft and it should be understood that several stages of accessories can conveniently be arranged in series as shown in this instance by the duplex water pump 24.

The supporting member for said accessories can be constructed in a manner and of such form as to suit the requirements for mounting any type of accessories other than those shown in the drawings. The extension drive shaft 14 referred to in this instance is shown as driven directly from the crank shaft. It is obvious however that this shaft can conveniently be driven indirectly therefrom as through intermediate gears, etc.

Variations may be resorted to within the scope of the invention and portions of the improvements may be used without the others whilst not departing from the spirit of the invention.

Having thus described my invention, I claim:—

1. An attachment for an internal combustion engine comprising, a bracket adapted to be secured to the engine and to suitably support a horizontal shaft for driving from said engine, a pair of side shafts each having a driven gear meshing with a common drive gear on said horizontal shaft, each end of each of said side shafts being adapted to drive an engine accessory supported by said bracket.

2. An accessory bracket adapted to be secured to an internal combustion engine and having a shaft driven from said engine, a pair of side shafts mounted in said bracket and driven from a common gear on said shaft and four engine accessories each adapted to be driven from an end of one of said side shafts.

3. An accessory drive bracket adapted for attachment to an internal combustion engine and having a main shaft adapted to be driven by said engine, a pair of side shafts each driven from said main driving shaft, means for supporting two magnetos for driving from the upper end of said side shafts and means for supporting an oil and a water pump respectively for driving from the lower ends of said side shafts.

4. In an aircraft engine, in combination, a crank case, a drive shaft, an accessory bracket adapted to be secured to said crank case, a second drive shaft in the accessory bracket, adapted to be drivably connected with the first said drive shaft, shafts mounted in said accessory bracket on either side of said second drive shaft and carrying gear wheels meshing with a gear wheel on the second said shaft, and means for mounting a plurality of engine accessories for driving from the ends of each of the two side shafts set forth.

5. In an internal combustion engine, the combination of a crank case, a crank shaft, a member mounted on said crank case and adapted to support a plurality of engine accessories grouped in superposed and juxtaposed positions thereon, drive shafts disposed on either side of the crank shaft and driven therefrom, each of said shafts being adapted to operate a plurality of accessories drivably arranged co-axially with said shafts.

6. A device of the character specified comprising a unit provided with means for mounting the same upon an internal combustion engine, said unit provided with means for mounting two series of engine accessories thereon spaced apart transversely of said engine, a drive shaft for each series, said drive shafts adapted to be operated by a main shaft disposed therebetween.

7. In an internal combustion engine, the combination of a crank case, a drive shaft, a supporting member secured to said crankcase, a pair of shafts supported in said member and disposed laterally of the drive shaft in a manner so as to have a driving relation therewith, a plurality of accessories having driving members, said accessories mounted on the supporting member in a manner so that their driving members are co-axially aligned with and driven from said pair of shafts.

8. In a mechanism of the class described, an accessory supporting unit adapted to be secured to an engine having a crank shaft extension, bearings in said unit adapted to support drive shafts disposed on either side of the crank shaft extension and operated thereby, a plurality of accessories mounted on said supporting unit adjacent to the ends of said drive shafts for operation therefrom.

9. An attachment for an internal combustion engine comprising a unit adapted to be secured to said engine and of such construction as to support two magnetos transversely spaced apart upon the upper portion of the unit, two pumps upon the lower portion thereof, means for supporting an additional accessory between the two magnetos, a pair of shafts, one end of each shaft adapted to operate a magneto and the other end thereof adapted to operate a pump, a horizontal drive shaft substantially central between and having a driving relation with the two said shafts and other means whereby an accessory can be driven from the end of said horizontal drive shaft.

10. In an internal combustion engine having a crank shaft with an extension thereto, in combination, a frame provided with means for attaching the same to an engine and to support an engine starting mechanism, means for supporting the crank shaft extension, a gear on said crank shaft extension, a shaft on either side of the gear and adapted to be operated thereby, an engine accessory connected to each end of each of said shafts in a manner so as to be driven thereby, said accessories being secured to the above said frame.

11. A unit adapted to be attached to an internal combustion engine and comprising, a housing member, a main shaft adapted to be driven from the engine and to drivably connect with a pair of driven gears and a shaft extending on either side of each of said gears for driving engine accessories.

12. In apparatus of the class described in combination, a housing, a drive shaft therein, driven shafts disposed on either side of said drive shaft and driven therefrom, and means on the housing adapted to support an accessory adjacent to the end of said drive shaft in a manner so as to be driven thereby and other means associated with said housing to support a plurality of accessories in a manner to be operated by the ends of said driven shafts.

13. A unit adapted to be attached to an internal combustion engine comprising a housing member, two side shafts with either end of each projecting from said housing for driving engine accessories, said side shafts driven from a main driving shaft disposed between them.

14. In apparatus of the class described, a housing, a drive shaft therein, driven shafts disposed on either side of said drive shaft and driven therefrom, each end of each driven shaft being so constituted as to afford a driving means for an engine accessory.

15. In apparatus of the class described, a housing, a drive shaft therein, driven shafts disposed on either side of said drive shaft and driven therefrom, a pair of accessories transversely spaced apart on the upper portion of said housing, a pair of accessories supported on the lower portion of the housing, each of said accessories disposed adjacent to an end of one of said driven shafts and adapted to be driven thereby, the driven shafts being mutually inclined to afford space between the accessories on the upper portion of said housing for an additional accessory therebetween and so as to bring the accessories on the lower portion of said housing in closer relation.

16. The combination with an internal combustion engine including a casing and a main drive shaft accessible from the outside of the casing, of a unit adapted to be mounted adjacent the accessible part of the main shaft, said unit including a power transmitting shaft provided with means for coupling the same with said main drive shaft, a pair of shafts supported in said unit, one on either side of the power transmitting shaft and adapted to be driven thereby, means on said unit adapted to support a plurality of accessories in a manner so as to be driven directly from the ends of said shafts and said power transmitting shaft, and other means adapted to support a starting mechanism in said unit.

17. In an internal combustion engine, the combination of a crank case, a member secured to said crank case adapted to support engine accessories thereon, a pair of accessory side shafts, a plurality of engine accessories on said member operated from the ends of the side shafts, said side shafts driven from a shaft therebetween.

18. A unit adapted to be attached to an internal combustion engine and comprising, a housing member, two side shafts having ends adjacent to openings in said housing for the driving of engine accessories and a common driving means for said drive shafts.

19. A unit adapted to be attached to an internal combustion engine and comprising, a main shaft adapted to be driven from the engine, side shafts adapted to be driven from the main shaft, and a bracket for supporting accessories in a manner so that their driving axes are aligned with said side shafts for coupling thereto.

20. A unit adapted to be attached to an internal combustion engine and comprising a pair of side shafts, a main shaft adapted for driving from the engine and to drive said side shafts, and means for coupling engine accessories each for unitary rotation with an end of one of said side shafts.

Signed at Keyport, in the county of Monmouth and State of New Jersey, this 26th day of December, A. D. 1922.

ROLAND CHILTON.